(12) United States Patent
Wang (10) Patent No.: US 9,344,931 B2
(45) Date of Patent: May 17, 2016

(54) METHOD AND DEVICE FOR RE-ESTABLISHING RADIO LINK

(71) Applicant: ZTE CORPORATION, Shenzhen, Guangdong Province (CN)

(72) Inventor: Dafei Wang, Shenzhen (CN)

(73) Assignee: ZTE Corporation (CN)

( * ) Notice: Subject to any disclaimer, the term of this patent is extended or adjusted under 35 U.S.C. 154(b) by 0 days.

(21) Appl. No.: 14/391,881

(22) PCT Filed: Apr. 9, 2013

(86) PCT No.: PCT/CN2013/073924
§ 371 (c)(1),
(2) Date: Oct. 10, 2014

(87) PCT Pub. No.: WO2013/152709
PCT Pub. Date: Oct. 17, 2013

(65) Prior Publication Data
US 2015/0079940 A1    Mar. 19, 2015

(30) Foreign Application Priority Data

Apr. 12, 2012   (CN) .......................... 2012 1 01061681

(51) Int. Cl.
*H04W 36/00* (2009.01)
*H04W 12/00* (2009.01)
(Continued)

(52) U.S. Cl.
CPC .......... *H04W 36/0077* (2013.01); *H04W 12/00* (2013.01); *H04W 12/08* (2013.01); *H04W 36/0055* (2013.01); *H04L 63/20* (2013.01); *H04W 76/028* (2013.01)

(58) Field of Classification Search
CPC .. H04W 36/0055; H04W 36/00; H04W 36/08

USPC .................. 455/438, 439, 442, 437
See application file for complete search history.

(56) References Cited

U.S. PATENT DOCUMENTS

| 8,724,818 B2 | 5/2014 | Li et al. |
| 2008/0096562 A1 | 4/2008 | Wu |

(Continued)

FOREIGN PATENT DOCUMENTS

| CN | 101848553 A | 9/2010 |
| CN | WO 2011003299 A1 | 1/2011 |

(Continued)

OTHER PUBLICATIONS

PCT/CN2013/073924, ZTE Corporation, International Search Report dated Jul. 18, 2013.

(Continued)

*Primary Examiner* — Kevin Kim
(74) *Attorney, Agent, or Firm* — McAfee & Taft (57) ABSTRACT

The disclosure provides a method and a device for re-establishing a radio link. The method comprises: a destination NodeB receives a re-establishment request message sent by UE, the re-establishment request message carrying a cause value, and the cause value comprising information used for indicating UE handover success or handover failure; and the destination NodeB determines, according to the cause value, a security algorithm applied radio link re-establishment between the destination NodeB and the UE, and establishes a radio link using the security algorithm. The disclosure solves the technical problem in the traditional art that the radio link re-establishment fails as a security algorithm fallback process fails, thereby achieving the technical effect of improving the success rate of radio link re-establishment.

4 Claims, 5 Drawing Sheets

(51) Int. Cl.
  *H04W 12/08*    (2009.01)
  *H04W 76/02*    (2009.01)
  *H04L 29/06*    (2006.01)

(56) References Cited

U.S. PATENT DOCUMENTS

| | | | |
|---|---|---|---|
| 2010/0111039 A1* | 5/2010 | Kim | H04W 76/048 370/331 |
| 2012/0129499 A1 | 5/2012 | Li | |
| 2012/0329460 A1* | 12/2012 | Huang | H04B 7/024 455/436 |
| 2014/0113647 A1 | 4/2014 | Shen et al. | |
| 2014/0146759 A1* | 5/2014 | Cho | H04W 76/02 370/329 |

FOREIGN PATENT DOCUMENTS

| | | |
|---|---|---|
| CN | 102232314 A | 2/2011 |
| CN | 102026404 A | 4/2011 |
| CN | 102123381 A | 7/2011 |
| CN | 102123462 A | 7/2011 |
| CN | WO 2011088677 A1 | 7/2011 |
| CN | 102223632 A | 10/2011 |
| CN | 102026404 A | 11/2011 |
| CN | 102625471 A | 8/2012 |
| CN | WO 2012126216 A1 | 9/2012 |
| CN | 102821384 A | 12/2012 |
| EP | 2381719 A1 | 10/2011 |

OTHER PUBLICATIONS

3GPP Radio Resource Control (RRC). Dec. 2009, TS 32.425, V 10.4.0.
EP 13 77 5401, ZTE Corporation, Supplementary Eurpopean Search Report dated May 29, 2015.

* cited by examiner

METHOD AND DEVICE FOR RE-ESTABLISHING RADIO LINK

TECHNICAL FIELD

The disclosure relates to the field of communications, in particular to a method and device for re-establishing a radio link.

BACKGROUND

When user equipment (referred to as UE) is handed over, after the UE is handed over to an E-UTRAN Node B (referred to as eNB) on the destination side, the UE needs to be configured by using a new security algorithm. However, with regard to the scenario of handover failure of the UE, the UE may initiate a re-establishment request, and uses the old security algorithm (i.e. a security algorithm used by an NB on the source side) instead of the security algorithm. Therefore, it is mentioned in the prior art that, when a UE handover is performed, an eNB on the source side needs to transmit a security algorithm thereof to an eNB on the destination side, wherein the security algorithm is used for application in the scenario of re-establishing a radio link.

However, in the prior art, it is only mentioned that the security algorithm of the eNB on the source side is transmitted to the eNB on the destination side and the security algorithm is applied to a potential scenario of re-establishing the radio link, but it does not distinguish the specific scenario of re-establishing the radio link. However, there are multiple scenarios of re-establishing the radio link, and some of the scenarios of re-establishing the radio link are not as a result of the handover failure of the UE. If the security algorithm of the UE falls back to the old security algorithm under this scenario, the problem of fallback process failure may happen.

For example, in the scenario of a non-contention based handover, UE receives Msg 2 (the second message randomly accessed), and at the moment, the UE considers that it is handed over successfully. However, because of the quality problem of a radio link, when a Reconfiguration Complete message is sent to an eNB on the destination side, the maximum number of re-transmission is exceeded in a radio link control (referred to as RLC) layer on the UE user plane, and at the moment, the UE may also initiate a re-establishment request to the eNB on the destination side. According to the prior art, since the eNB on the destination side does not receive the reconfiguration complete message, the eNB on the destination side considers that the handover is unsuccessful, and may update a security algorithm of the UE to the old security algorithm if receiving the re-establishment request at the moment. However, since the UE considers that it is handed over successfully at the moment, the security algorithm used by the UE has already been a new security algorithm. However, because of the failure to send the reconfiguration complete message to the eNB on the destination side, the UE sends the re-establishment request to the eNB on the destination side and it is not handover failure of the UE in real sense, and thus a security algorithm fallback process performed by the eNB on the destination side must fail.

In the traditional art, a security algorithm fallback process is performed inaccurately in a procedure of re-establishing a radio link, thus rendering the problems of the failure of re-establishing the radio link and the lower success rate of re-establishing the radio link.

SUMMARY

The disclosure provides a method and device for re-establishing a radio link so as to at least solve the technical problem that in the traditional art, a security algorithm fallback process is performed inaccurately in a procedure of re-establishing a radio link, thus rendering the failure of re-establishing the radio link and the lower success rate of re-establishing the radio link.

According to one aspect of the disclosure, a method for re-establishing a radio link is provided and comprises: a destination NodeB receiving a re-establishment request message sent by a UE, wherein the re-establishment request message carries a cause value, and the cause value comprises information used for indicating that the UE hands over successfully or unsuccessfully; and the destination NodeB determining, according to the cause value, a security algorithm applied to radio link re-establishment between the destination NodeB and the UE, and establishing the radio link using the security algorithm.

Preferably, the destination NodeB determining, according to the cause value, the security algorithm applied to radio link re-establishment between the destination NodeB and the UE, and establishing the radio link using the security algorithm comprises: when the cause value indicates that the UE hands over successfully, the destination NodeB determines a security algorithm of the destination NodeB as the security algorithm, and establishes the radio link using the security algorithm of the destination NodeB.

Preferably, the destination NodeB determining, according to the cause value, the security algorithm applied to radio link re-establishment between the destination NodeB and the UE, and establishing the radio link using the security algorithm comprise: when the cause value indicates that the UE hands over unsuccessfully, the destination NodeB determines a security algorithm of a source NodeB corresponding to the UE as the security algorithm, and establishes the radio link using the security algorithm of the source NodeB.

According to another aspect of the disclosure, a method for re-establishing a radio link is provided and comprises: UE determines a handover result of the UE; and the UE sends to a destination NodeB a re-establishment request carrying a cause value used for indicating the handover result, wherein the cause value is used for indicating that the destination NodeB determines, according to the cause value, a security algorithm applied to radio link re-establishment between the destination NodeB and the UE.

Preferably, the UE sends to the destination NodeB a re-establishment request carrying a cause value used for indicating the handover result, wherein the cause value is used for indicating that the destination NodeB determines, according to the cause value, the security algorithm applied to radio link re-establishment between the destination NodeB and the UE, comprising: when the UE hands over successfully, the UE sending to the destination NodeB the re-establishment request carrying the cause value, wherein the cause value comprises information indicating that the UE hands over successfully and the cause value is used for indicating that the destination NodeB determines a security algorithm of the destination NodeB as the security algorithm, and establishes the radio link applying the security algorithm of the destination NodeB; and when the UE hands over unsuccessfully, the UE sending to the destination NodeB the re-establishment request carrying the cause value, wherein the cause value comprises information indicating that the UE hands over unsuccessfully, and the cause value is used for indicating that the destination NodeB determines a security algorithm of a source NodeB corresponding to the UE as the security algorithm, and establishes a radio link applying the security algorithm of the source NodeB.

According to a further aspect of the disclosure, a device for re-establishing a radio link is provided. The device is applied to a NodeB and comprises: a receiving module, configured to receive a re-establishment request message sent by UE, wherein the re-establishment request message carries a cause value, and the cause value comprises information used for indicating that the UE hands over successfully or unsuccessfully; and a determination module, configured to determine according to the cause value, a security algorithm applied to radio link re-establishment between the destination NodeB and the UE, and to establish the radio link using the security algorithm.

Preferably, a determination module includes: a first determination unit, configured to determine, when the cause value indicates that the UE hands over successfully, a security algorithm of the destination NodeB as the security algorithm, and to establish a radio link applying the security algorithm of the destination NodeB.

Preferably, a determination module includes: a second determination unit, configured to determine, when the cause value indicates that the UE hands over unsuccessfully, a security algorithm of a source NodeB corresponding to the UE as the security algorithm, and to establish a radio link applying the security algorithm of the source NodeB.

According to a further aspect of the disclosure, a device for re-establishing a radio link is provided. The device is applied to UE and comprises: a determination module, configured to determine a handover result of the UE; and a sending module, configured to send to a destination NodeB a re-establishment request carrying a cause value used for indicating the handover result, wherein the cause value is used for indicating that the destination NodeB determines, according to the cause value, a security algorithm applied to radio link re-establishment between the destination NodeB and the UE.

Preferably, a sending module includes: a first sending unit, configured to, when the UE hands over successfully, send to the destination NodeB a re-establishment request carrying a cause value, wherein the cause value comprises information indicating the UE hands over successfully and the cause value is used for indicating that the destination NodeB determines a security algorithm of the destination NodeB as the security algorithm, and establishes the radio link applying the security algorithm of the destination NodeB; and a second sending unit configured to, when is the UE hands over unsuccessfully, send to the destination NodeB a re-establishment request carrying a cause value, wherein the cause value comprises information indicating that the UE hands over unsuccessfully and the cause value is used for indicating that the destination NodeB determines the security algorithm of a source NodeB corresponding to the UE as the security algorithm, and establishes the radio link applying the security algorithm of the source NodeB.

In the disclosure, during a process of re-establishing the radio link, the destination NodeB receives the re-establishment request message sent by the UE, wherein the re-establishment request message carries the cause value; the cause value comprises the information used for indicating that the UE hands over successfully or unsuccessfully; and the destination NodeB may determine, according to the cause value, whether the UE is handed over successfully, then may determine the security algorithm applied to radio link re-establishment between the destination NodeB and the UE, and establishes the radio link using the security algorithm. The problem in the traditional art that a radio link re-establishment fails as a result of not being able to determine the security algorithm applied to radio link re-establishment as a security algorithm fallback process fails is avoided. By the above-mentioned method, the destination NodeB may accurately determine a security algorithm applied to radio link re-establishment, achieving the technical effect of improving the success rate of radio link re-establishment.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the drawings.

DETAILED DESCRIPTION OF THE EMBODIMENTS

The disclosure is described below with reference to the accompanying drawings and embodiments in detail. Note that, the embodiments of the disclosure and the features of the embodiments can be combined with each other if there is no conflict.

Figure 1:
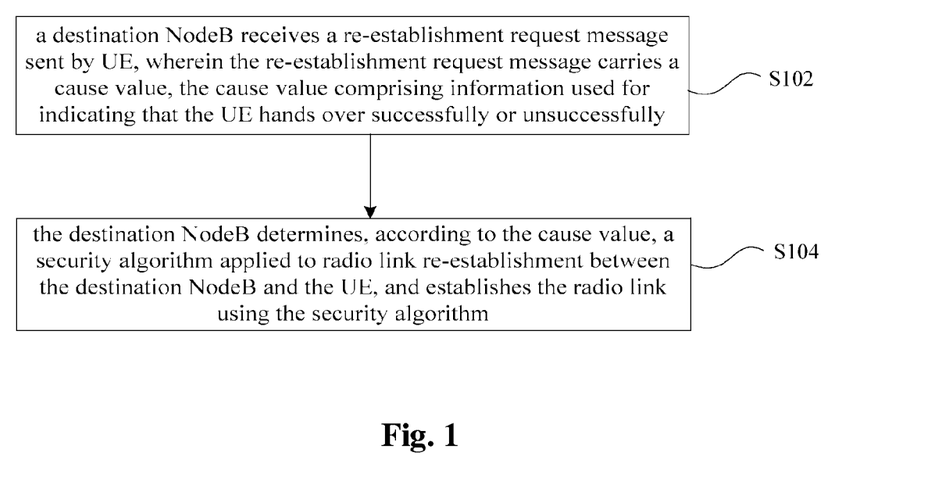
FIG. 1 is a flowchart of a method for re-establishing a radio link according to an embodiment of the disclosure.

In the present preferred embodiment, a method for re-establishing a radio link is provided. FIG. 1 is a flowchart of a method for re-establishing a radio link according to an embodiment of the disclosure. As shown in FIG. 1, the method for re-establishing a radio link includes steps S102-S104.

Step S102: a destination NodeB receives a re-establishment request message sent by UE, wherein the re-establishment request message carries a cause value, the cause value comprising information used for indicating that the UE hands over successfully or unsuccessfully.

Step S104: the destination NodeB determines, according to the cause value, a security algorithm applied to radio link re-establishment between the destination NodeB and the UE, and establishes the radio link using the security algorithm.

In the above steps, during a process of re-establishing the radio link, the destination NodeB receives the re-establishment request message sent by the UE, wherein the re-establishment request message carries the cause value; the cause value comprises the information used for indicating that the UE hands over successfully or unsuccessfully; and the destination NodeB may determine, according to the cause value, whether the UE is handed over successfully, then may determine the security algorithm applied to radio link re-establishment between the destination NodeB and the UE, and establish the radio link using the security algorithm. The problem in the traditional art that a radio link re-establishment fails as a result of not being able to determine the security algorithm applied to radio link re-establishment as a security algorithm fallback process fails is avoided. By the above-mentioned method, the destination NodeB can accurately determine a security algorithm applied to radio link re-establishment, achieving the technical effect of improving the success rate of radio link re-establishment.

In order to accurately determine, according to the cause value, the security algorithm applied to radio link re-establishment between the destination NodeB and the UE, the present preferred embodiment provides a preferred method of determining, according to the cause value, the security algorithm applied to radio link re-establishment between the destination NodeB and the UE, and using the security algorithm to establish a radio link. For example, when the cause value carried in the received re-establishment request message indicates that the UE hands over successfully, the destination NodeB determines a security algorithm of the destination NodeB as the security algorithm applied to radio link re-establishment as, and establishes the radio link applying the security algorithm of the destination NodeB.

In the above-mentioned preferred embodiment, when the cause value carried in the received re-establishment request message indicates that the UE hands over successfully, i.e., when no security algorithm fallback is needed, even if the re-establishment request message is sent in scenarios such as a reconfiguration complete message fails to be sent, the destination NodeB may still determine, according to the cause value, whether is the UE hands over successfully and does not need to perform the security algorithm fallback, avoiding the problem that the security algorithm fallback process fails as the results of whether the UE hands over successfully, which are considered by the UE and the eNB on the destination side, are inconsistent in the scenario that it is not true that the UE hands over unsuccessfully in real sense (for example, the UE hands over successfully, and the radio link is not established unsuccessfully because of other reasons, so that it does not need to re-establish a radio link) Furthermore, the destination NodeB may determine a security algorithm of the determination NodeB as the security algorithm applied to the radio link re-establishment, and establishes a radio link applying the security algorithm of the determination NodeB, avoiding the problem in the traditional art that the security algorithm fallback process initiated by the eNB on the destination side (NodeB) fails as the results of whether the UE hands over successfully, which are considered by the UE and the eNB on the destination side, are inconsistent, and thus improving the accuracy of the destination NodeB to determine whether the UE hands over successfully, and improving the accuracy of determining, according to the cause value, the security algorithm applied to radio link re-establishment between the destination NodeB and the UE.

Meanwhile, in order to improve application flexibility so as to meet application requirements of different scenarios, the present preferred embodiment provides a preferred method of determining, according to a cause value, a security algorithm applied to radio link re-establishment between a destination NodeB and UE, and using the determined security algorithm to establish a radio link. For example, when the cause value carried in the received re-establishment request message indicates that the UE hands over unsuccessfully, the destination NodeB determines a security algorithm of a source NodeB corresponding to the UE as the applied security algorithm, and establishes the radio link applying the security algorithm of the source NodeB.

In the above-mentioned preferred embodiment, when the cause value carried in the received re-establishment request message indicates that the UE hands over unsuccessfully, i.e., when a security algorithm fallback is needed, the destination NodeB may determine, according to the cause value, that the UE hands over unsuccessfully and it is necessary to perform the security algorithm fallback. The problem that the security algorithm fallback process fails as the results of whether the UE hands over successfully, which are considered by the UE and the eNB on the destination side, are inconsistent in the scenario that it is not true that the UE hands over unsuccessfully is avoided, thereby determining a security algorithm of the source NodeB as the security algorithm applied to the radio link re-establishment, and establishing a radio link applying the security algorithm of the source NodeB, and thus improving the accuracy of the destination NodeB to determine whether the UE hands over successfully, and improving the accuracy of determining, according to the cause value, the security algorithm applied to radio link re-establishment between the destination NodeB and the UE; and at the same time, application requirements of different scenarios may be met, improving the application flexibility of the present preferred embodiment.

Figure 2:
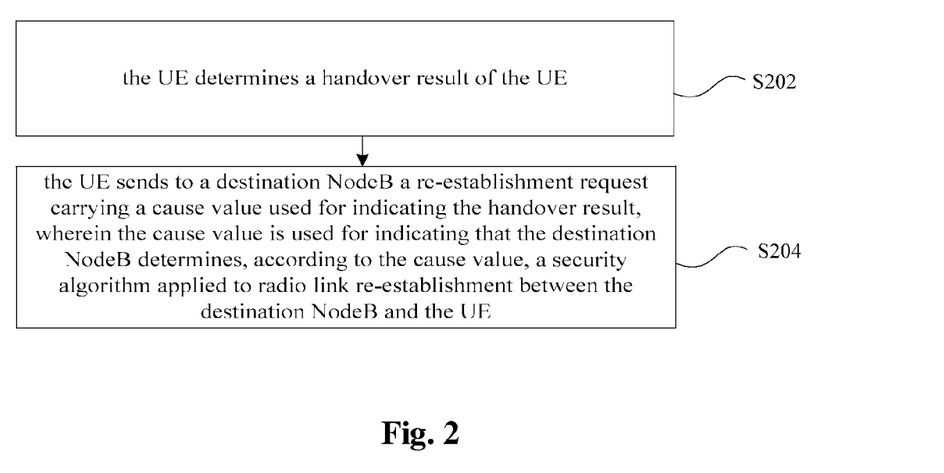
FIG. 2 is another flowchart of a method for re-establishing a radio link according to an embodiment of the disclosure.

The present preferred embodiment also provides another method for re-establishing a radio link. FIG. 2 is another flowchart of a method for re-establishing a radio link according to an embodiment of the disclosure. As shown in FIG. 2, the method for re-establishing a radio link includes steps S202-S204.

Step S202: the UE determines a handover result of the UE.

Step S204: the UE sends to a destination NodeB a re-establishment request carrying a cause value used for indicating the handover result, wherein the cause value is used for indicating that the destination NodeB determines, according to the cause value, a security algorithm applied to radio link re-establishment between the destination NodeB and the UE.

In the above steps, the UE firstly determines whether the UE hands over successfully, and uses the cause value to indicate a determined handover result. When the re-establishment request is sent to the destination NodeB, the cause value is carried in the re-establishment request to instruct the destination NodeB to determine, according to the cause value, whether the UE hands over successfully. The problem that the security algorithm fallback process fails as the results of whether the UE hands over successfully, which are considered by the UE and the eNB on the destination side, are inconsistent in the scenario of not being handover failure of the UE in real sense is avoided, thus determining a security algorithm applied to radio link re-establishment between the destination NodeB and the UE. The problem in the traditional art that a radio link re-establishment fails as a result of not being able to determine the security algorithm applied to radio link re-establishment as a security algorithm fallback process fails is avoided so that the destination NodeB may accurately determine a security algorithm applied to radio link re-establishment, thereby improving the success rate of radio link re-establishment.

In order to accurately send the destination NodeB the re-establishment request carrying the cause value used for indicating the handover result, at the same time, to increase the application flexibility of the present preferred embodiment, the present preferable embodiment provides a method for sending to a destination NodeB a re-establishment request carrying a cause value used for indicating the handover result, wherein the cause value is used for indicating that the destination NodeB determines, according to the cause value, a security algorithm applied to radio link re-establishment between the destination NodeB and UE. For example, when the UE hands over successfully, the UE sends to the destination NodeB the re-establishment request carrying the cause value, wherein the cause value comprises information indicating that the UE hands over successfully and is used for indicating that the destination NodeB determines the security algorithm of the destination NodeB as the security algorithm, and establishes a radio link applying the security algorithm of the destination NodeB; and when the UE hands over unsuccessfully, the UE sends to the destination NodeB a re-establishment request carrying a cause value, wherein the cause value comprises information indicating that the UE hands over unsuccessfully and is used for indicating that the destination NodeB determines the security algorithm of a source NodeB corresponding to the UE as the security algorithm, and establishes a radio link applying the security algorithm of the source NodeB.

In the above-mentioned preferred embodiment, when the UE hands over successfully, i.e., when no security algorithm fallback is needed, a cause value comprising information indicating that the UE hands over successfully is carried in a re-establishment request and is sent to a destination NodeB, and even if a re-establishment request message is sent in scenarios such as a reconfiguration complete message fails to be sent, the destination NodeB can still determine, according to the cause value, that the UE hands over successfully and does not need to perform the security algorithm fallback, thus determining the security algorithm of the destination NodeB as the security algorithm applied to radio link re-establishment, and establishing the radio link applying the security algorithm of the destination NodeB; when the UE hands over unsuccessfully, i.e., when the security algorithm fallback is needed, the destination NodeB can determine, according to the cause value, that the UE hands over unsuccessfully and it is necessary to perform the security algorithm fallback, thus determining a security algorithm of the source NodeB as the security algorithm applied to the radio link re-establishment, and establishing a radio link applying the security algorithm of the source NodeB, and therefore improving the accuracy that the destination NodeB determines whether the UE hands over successfully, and improving the accuracy of determining, according to the cause value, the security algorithm applied to radio link re-establishment between the destination NodeB and the UE; and at the same time, application requirements of different scenarios can be met, and the application flexibility of the present preferable embodiment is improved.

Various preferable embodiments mentioned above will be described in detail below in conjunction with the accompanying drawings and several preferable examples.

Example 1

Figure 3:
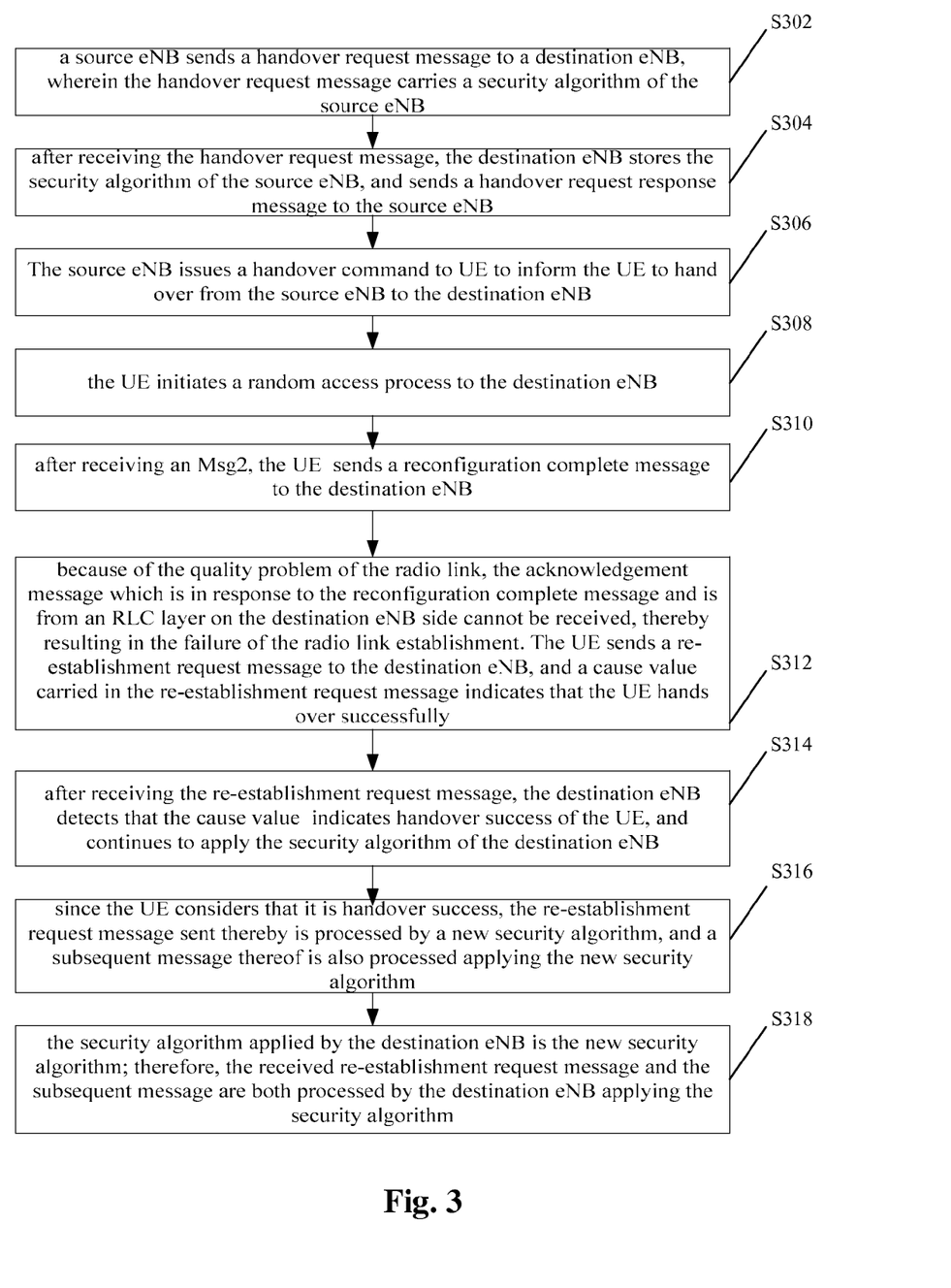
FIG. 3 is a flowchart of example 1 of a method for re-establishing a radio link according to an embodiment of the disclosure.

In the example, taking the scenario of performing radio link re-establishment when UE hands over successfully for example, as shown in FIG. 3, the method for re-establishing the radio link comprises step S302 to step S318.

Step S302: a source eNB (NodeB) sends a handover request message to a destination eNB, wherein the handover request message carries a security algorithm of the source eNB.

Step S304: after receiving the handover request message, the destination eNB stores the security algorithm of the source eNB, and sends a handover request response message to the source eNB.

Step S306: the source eNB issues a handover command to UE to inform the UE to hand over form the source eNB to the destination eNB.

Step S308: the UE initiates a random access process to the destination eNB.

Step S310: after receiving an Msg2 (process message 2), the UE determines that the UE hands over successfully, and sends a reconfiguration complete message to the destination eNB.

Step S312: because of the quality problem of the radio link, the acknowledgement message which is in response to the reconfiguration complete message and is from an RLC layer on the destination eNB side cannot be received, thereby resulting in the failure of the radio link establishment. The UE sends a re-establishment request message to the destination eNB, and a cause value carried in the re-establishment request message indicates other failure, i.e., the cause value indicates that the UE hands over successfully, because there are three types of the cause value: 1. Reconfiguration failure; 2. Handover failure; 3. Other failure, and only 2 indicates handover failure of the UE; and in scenarios where the cause value is 1 or 3, it is handover success of the UE.

Step S314: after receiving the re-establishment request message, the destination eNB detects that the cause value carried in the re-establishment request message is not handover failure (handover failure of the UE), i.e. the cause value indicates handover success of the UE, and continues to apply the security algorithm of the destination eNB.

Step S316: since the UE considers that it is handover success, the re-establishment request message sent thereby is processed by a new security algorithm (a security algorithm of the destination NodeB), and a subsequent message thereof is also processed applying the new security algorithm.

Step S318: the security algorithm applied by the destination eNB is the new security algorithm; therefore, the received re-establishment request message and the subsequent message are both processed by the destination eNB applying the security algorithm.

In the present embodiment, when it is handover success of the UE, i.e., when no security algorithm fallback is needed, even if a re-establishment request message is sent in scenarios such as a reconfiguration complete message fails to be sent, the destination NodeB may still determine, according to the cause value, handover success of the UE and does not need to perform the security algorithm fallback, thus determining a security algorithm of the destination NodeB as the security algorithm applied to radio link re-establishment, and establishing a radio link applying the security algorithm of the destination NodeB. The problem in the traditional art that the security algorithm fallback process initiated by the eNB on the destination side (NodeB) fails as the results of whether it is handover success of the UE, which is considered by the UE and eNB on the destination side, are inconsistent is avoided.

Example 2

Figure 4:
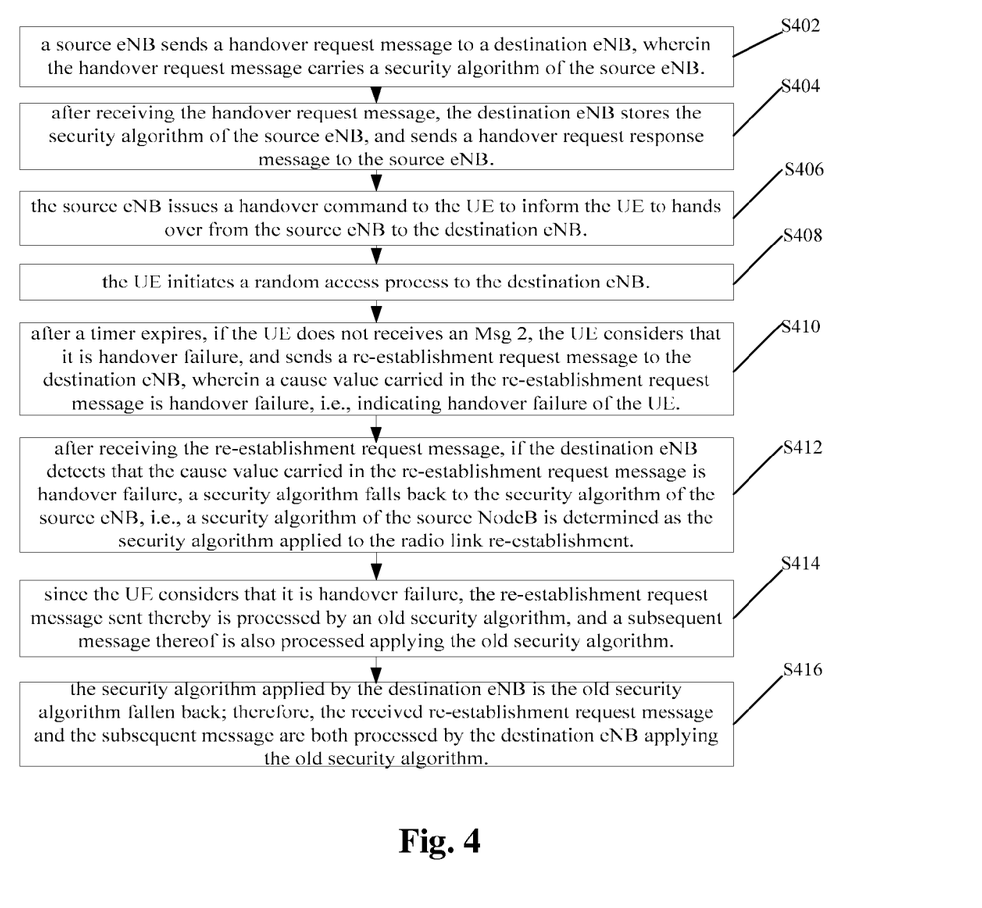
FIG. 4 is a flowchart of example 2 of a method for re-establishing a radio link according to an embodiment of the disclosure.

In the example, taking the scenario of performing radio link re-establishment when it is handover failure of UE for example, as shown in FIG. 4, the method for re-establishing the radio link comprises step S402 to step S416.

Step S402: a source eNB sends a handover request message to a destination eNB, wherein the handover request message carries a security algorithm of the source eNB.

Step S404: after receiving the handover request message, the destination eNB stores the security algorithm of the source eNB, and sends a handover request response message to the source eNB.

Step S406: the source eNB issues a handover command to the UE to inform the UE to hands over from the source eNB to the destination eNB.

Step S408: the UE initiates a random access process to the destination eNB.

Step S410: after a timer expires, if the UE does not receives an Msg 2, the UE considers that it is handover failure, and sends a re-establishment request message to the destination eNB, wherein a cause value carried in the re-establishment request message is handover failure, i.e., indicating handover failure of the UE.

Step S412: after receiving the re-establishment request message, if the destination eNB detects that the cause value carried in the re-establishment request message is handover failure, a security algorithm falls back to the security algorithm of the source eNB, i.e., a security algorithm of the source NodeB is determined as the security algorithm applied to the radio link re-establishment.

Step S414: since the UE considers that it is handover failure, the re-establishment request message sent thereby is processed by an old security algorithm, and a subsequent message thereof is also processed applying the old security algorithm.

Step S416: the security algorithm applied by the destination eNB is the old security algorithm fallen back; therefore, the received re-establishment request message and the subsequent message are both processed by the destination eNB applying the old security algorithm.

In the example, when the UE hands over unsuccessfully, i.e., when a security algorithm fallback is needed, a destination NodeB may determine, according to a cause value, that the UE hands over unsuccessfully and it is necessary to perform the security algorithm fallback, thus determining a security algorithm of the source NodeB as the security algorithm applied to the radio link re-establishment, and establishing a radio link applying the security algorithm of the source NodeB.

Figure 5:
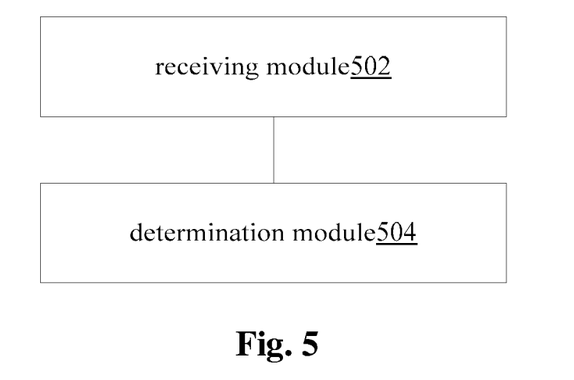
FIG. 5 is a structural block diagram of a device for re-establishing a radio link and applied to a NodeB according to an embodiment of the disclosure.

In the present preferable embodiment, a preferable device for re-establishing a radio link is also provided; FIG. 5 is a structural block diagram of a device for re-establishing a radio link applied to a NodeB according to one embodiment of the disclosure; preferably, the device may be applied to the NodeB; and as shown in FIG. 5, the device for re-establishing a radio link comprises: a receiving module 502, a destination module 504. The structure above is described in details below.

The receiving module 502 is configured to receive a re-establishment request message sent by user equipment (UE), wherein the re-establishment request message carries a cause value; the cause value comprises information used for indicating handover success or handover failure of the UE; and the determination module 504 connected to the receiving module 502 is configured to determine, according to the cause value, a security algorithm applied to radio link re-establishment between a destination NodeB and the UE, and establish the radio link using the security algorithm.

In the above-mentioned embodiment, during a process of re-establishing the radio link, the receiving module 502 receives the re-establishment request message sent by the UE, wherein the re-establishment request message carries the cause value; the cause value comprises the information used for indicating handover success or handover failure of the UE; and the determination module 504 may determine, according to the cause value, whether it is handover success of the UE, then may determine the security algorithm applied to radio link re-establishment between the destination NodeB and the UE, and establishes the radio link using the security algorithm. The problem in the traditional art that a radio link re-establishment fails resulted by not being able to determine the security algorithm applied to radio link re-establishment as a security algorithm fallback process fails is avoided. By the above-mentioned solution, the destination NodeB may accurately determine a security algorithm applied to radio link re-establishment so that the success rate of radio link re-establishment is improved.

Figure 6:
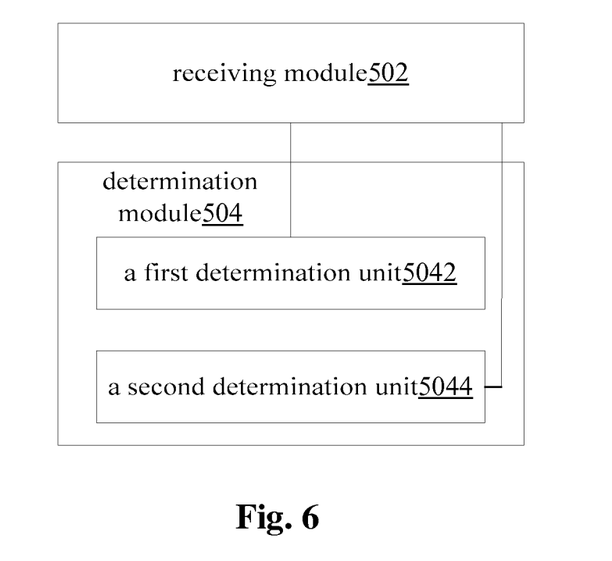
FIG. 6 is a structural block diagram of a determination module according to an embodiment of the disclosure.

In order to accurately determine, according to a cause value, a security algorithm applied to radio link re-establishment between a destination NodeB and UE, and at the same time, to meet the application requirements of different scenarios, in the present preferable embodiment, as shown in FIG. 6, the above-mentioned determination module 504 comprises: a first determination unit 5042, a second determination unit 5044. The structure above is described in details below.

A first determination unit 5042 is configured to determine, when a cause value indicates handover success of UE, the security algorithm of the destination NodeB as the security algorithm, and establish a radio link applying the security algorithm of the destination NodeB. A second determination unit 5044 is configured to determine, when a cause value indicates that the UE hands over successfully, the security algorithm of a source NodeB corresponding to the UE as the applied security algorithm, and establish a radio link using the security algorithm of the source NodeB.

In the above-mentioned preferable embodiment, when it is handover success of UE, i.e., when no security algorithm fallback is needed, even if a re-establishment request message is sent in scenarios such as a reconfiguration complete message fails to be sent, the first determination unit 5042 can still determine, according to the cause value, handover success of the UE and does not need to perform the security algorithm fallback. The problem that the security algorithm fallback process fails as the results of whether it is handover success of the UE, which is considered by the UE and an eNB on the destination side, are inconsistent in scenario that it is no handover failure of the UE in real sense (handover success of the UE, failure of radio link establishment resulted by other causes, and needing to re-establish a radio link) is avoided, thus taking a security algorithm of the determination NodeB as the security algorithm applied to the radio link re-establishment, and establishing a radio link applying the security algorithm of the determination NodeB; when the UE hands over unsuccessfully, i.e., when the security algorithm fallback is needed, the second determination unit 5044 can determine, according to a cause value, that the UE hands over unsuccessfully and it is necessary to perform the security algorithm fallback, thus taking a security algorithm of the source NodeB as the security algorithm applied to radio link re-establishment, and establishing a radio link applying the security algorithm of the source NodeB; and therefore improving the accuracy that the destination NodeB determines whether it is handover success of the UE, and improving the accuracy of determining, according to the cause value, the security algorithm applied to radio link re-establishment between the destination NodeB and the UE; and at the same time, application requirements of different scenarios may be met, and the application flexibility of the present preferable embodiment is improved.

Figure 7:
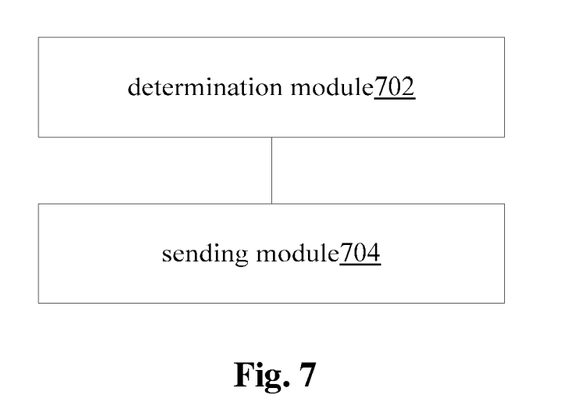
FIG. 7 is a structural block diagram of a device for re-establishing a radio link and applied to UE according to an embodiment of the disclosure.

In the present preferable embodiment, another device for re-establishing a radio link is also provided; FIG. 7 is a structural block diagram of a device for re-establishing a radio link applied to UE according to one embodiment of the disclosure; preferably, the device may be applied to the UE; and as shown in FIG. 7, the device for re-establishing a radio link comprises: a determination module 702, a sending module 704. The structure above is described in details below.

A determination module 702 is configured to determine a handover result of UE; a sending module 704 connected to the determination module 702 is configured to send to a destination NodeB a re-establishment request carrying a cause value used for indicating the handover result, wherein the cause value is used for indicating that the destination NodeB determines, according to the cause value, a security algorithm applied to radio link re-establishment between the destination NodeB and the UE.

In the above-mentioned embodiment, the determination module 702 firstly determines whether it is handover success of the UE, and uses the cause value to indicate a determined handover result; when the sending module 704 sends to the destination NodeB the re-establishment request, the cause value is carried in the re-establishment request to instruct the destination NodeB to determine, according to the cause value, whether it is handover success of the UE. The problem that the security algorithm fallback process fails as the results of whether it is handover success of the UE, which is considered by the UE and a eNB on the destination side, are inconsistent in scenario that it is no handover failure of the UE in real sense is avoided, thus determining a security algorithm applied to radio link re-establishment between the destination NodeB and the UE. The problem in the traditional art that a radio link re-establishment fails resulted by not being able to determine the security algorithm applied to radio link re-establishment as a security algorithm fallback process fails is avoided, and thus the destination NodeB may accurately determine a security algorithm applied to radio link re-establishment so that the success rate of radio link re-establishment is improved.

Figure 8:
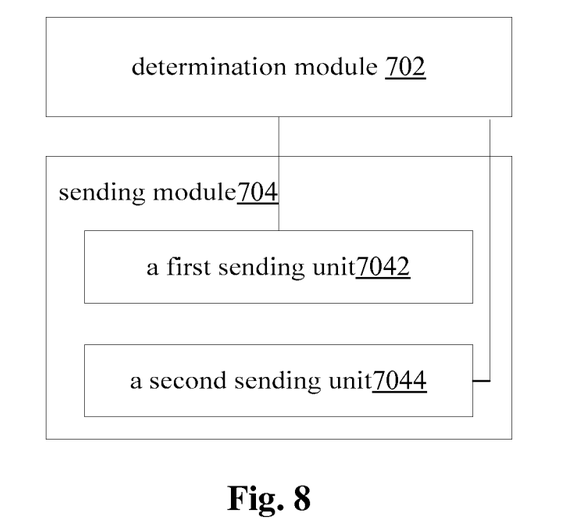
FIG. 8 is a structural block diagram of a sending module according to an embodiment of the disclosure.

In order to accurately send to a destination NodeB a re-establishment request carrying a cause value used for indicating a handover result, at the same time, to increase the application flexibility of the present preferable embodiment, as shown in FIG. 8, in the present preferable embodiment, the above-mentioned sending module 704 comprises: a first sending unit 7042, which is configured to send to, when it is handover success of UE, a destination NodeB a re-establishment request carrying a cause value, wherein the caused value comprises information used for indicating handover success of the UE and is used for indicating that the destination NodeB determines the security algorithm of the destination NodeB as a applied security algorithm, and establishes a radio link applying the security algorithm of the destination NodeB; and a second sending unit 7044, which is configured to send to, when it is handover failure of the UE, the destination NodeB a re-establishment request carrying a cause value, wherein the cause value comprises information indicating handover failure of the UE and is used for indicating that the destination NodeB determines the security algorithm of a source NodeB corresponding to the UE as a applied security algorithm, and establishes a radio link applying the security algorithm of the source NodeB.

In the above-mentioned preferred embodiment, when it is handover success of the UE, i.e., when no security algorithm fallback is needed, a first sending unit 7042 sends to a destination NodeB a cause value which comprises information indicating handover success of the UE and is carried in a re-establishment request; even if the re-establishment request message is sent in scenarios such as a reconfiguration complete message fails to be sent, the destination NodeB may still determine, according to the cause value, handover success of the UE and does not need to perform the security algorithm fallback, thus determining a security algorithm of the destination NodeB as the security algorithm applied to radio link re-establishment, and establishing the radio link applying the security algorithm of the destination NodeB; when the UE hands over unsuccessfully, i.e., when the security algorithm fallback is needed, the second sending unit 7044 sends a destination NodeB a cause value which comprises information indicating that the UE hands over unsuccessfully and is carried in a re-establishment request; the destination NodeB may determine, according to the cause value, that the UE hands over unsuccessfully and it is necessary to perform the security algorithm fallback, thus determining a security algorithm of the source NodeB as the security algorithm applied to the radio link re-establishment, and establishing a radio link applying the security algorithm of the source NodeB, and therefore improving the accuracy that the destination NodeB determines whether it is handover success of the UE, and improving the accuracy of determining, according to the cause value, the security algorithm applied to radio link re-establishment between the destination NodeB and the UE; and at the same time, application requirements of different scenarios can be met, and the application flexibility of the present preferable embodiment is improved.

Obviously, those skilled in the art should know that each of the mentioned modules or steps of the disclosure can be realized by universal computing apparatus; the modules or steps can be focused on single computing apparatus, or distributed on the network formed by multiple computing apparatuses; selectively, they can be realized by the program codes which can be executed by the computing apparatus; thereby, the modules or steps can be stored in the storage apparatus and executed by the computing apparatus; and under some circumstances, the shown or described steps can be executed in different orders, or can be independently manufactured as each integrated circuit module, or multiple modules or steps thereof can be manufactured to be single integrated circuit module, thus to be realized. In this way, the disclosure is not restricted to any particular hardware and software combination.

The descriptions above are only the preferable embodiment of the disclosure, which are not used to restrict the disclosure, for those skilled in the art, the disclosure may have various changes and variations. Any modification, equivalent replacement, or improvement made within the spirit and principle of the disclosure shall all fall within the protection scope of the disclosure.

What is claimed is:

1. A method for re-establishing a radio link, comprising:
    a destination NodeB receiving a Re-establishment Request message sent by user equipment (UE), wherein the Re-establishment Request message carries a cause value, the cause value comprising information used for indicating that the UE hands over successfully or unsuccessfully; and
    the destination NodeB determining, according to the cause value, a security algorithm applied to radio link re-establishment between the destination NodeB and the UE, and establishing the radio link using the security algorithm; wherein
    the destination NodeB determining, according to the cause value, the security algorithm applied to the radio link re-establishment between the destination NodeB and the UE, and establishing the radio link using the security algorithm comprise:
        if the cause value indicates that the UE hands over successfully, the destination NodeB determining a security algorithm of the destination NodeB as the applied security algorithm, and establishing the radio link applying the security algorithm of the destination NodeB; or,
        if the cause value indicates that the UE hands over unsuccessfully, the destination NodeB determining a security algorithm of a source NodeB corresponding to the UE as the applied security algorithm, and establishing the radio link applying the security algorithm of the source NodeB.

2. A method for re-establishing a radio link, comprising:

user equipment (UE) determining a handover result of the UE; and the UE sending to a destination NodeB a Re-establishment Request carrying a cause value used for indicating the handover result, wherein the cause value is used for indicating that the destination NodeB determines, according to the cause value, a security algorithm applied to radio link re-establishment between the destination NodeB and the UE; wherein the UE sending to the destination NodeB a Re-establishment Request carrying a cause value used for indicating the handover result, wherein the cause value is used for indicating that the destination NodeB determines, according to the cause value, the security algorithm applied to radio link re-establishment between the destination NodeB and the UE comprises:

when the UE hands over successfully, the UE sending to the destination NodeB the Re-establishment Request carrying the cause value, wherein the cause value comprises information indicating that the UE hands over successfully and the cause value is used for indicating that the destination NodeB determines a security algorithm of the destination NodeB as the applied security algorithm, and establishes the radio link applying the security algorithm of the destination NodeB; and when the UE hands over unsuccessfully, the UE sending to the destination NodeB a Re-establishment Request carrying a cause value, wherein the cause value comprises information indicating that the UE hands over unsuccessfully, and the cause value is used for indicating that the destination NodeB determines a security algorithm of a source NodeB corresponding to the UE as the applied security algorithm, and establishes the radio link applying the security algorithm of the source NodeB.

3. A device for re-establishing a radio link, the device being applied to a NodeB, the device comprising:

a receiving module, configured to receive a Re-establishment Request message sent by user equipment (UE), wherein the Re-establishment Request message carries a cause value, the cause value comprising information used for indicating that the UE hands over successfully or unsuccessfully; and a determination module configured to determine, according to the cause value, a security algorithm applied to radio link re-establishment between the destination NodeB and the UE, and to establish the radio link using the security algorithm; wherein the determination module comprises:

a first determination unit, configured to determine, when the cause value indicates that the UE hands over successfully, a security algorithm of the destination NodeB as the applied security algorithm, and to establish the radio link applying the security algorithm of the destination NodeB; or, a second determination unit, configured to determine, when the cause value indicates that the UE hands over unsuccessfully, the security algorithm as a security algorithm of a source NodeB corresponding to the UE, and to establish the radio link applying the security algorithm of the source NodeB.

4. A device for re-establishing a radio link, the device being applied to user equipment (UE), the device comprising:

a determination module, configured to determine a handover result of the UE; and a sending module, configured to send to a destination NodeB a Re-establishment Request carrying a cause value used for indicating the handover result, wherein the cause value is used for indicating that the destination NodeB determines, according to the cause value, a security algorithm applied to radio link re-establishment between the destination NodeB and the UE; wherein the sending module comprises:

a first sending unit, configured to, when the UE hands over successfully, send to the destination NodeB a Re-establishment Request carrying the cause value, wherein the cause value comprises information indicating that the UE hands over successfully and the cause value is used for indicating that the destination NodeB determines a security algorithm of the destination NodeB as the applied security algorithm, and establishes the radio link applying the security algorithm of the destination NodeB; and a second sending unit, configured to, when the UE hands over unsuccessfully, send to the destination NodeB a Re-establishment Request carrying a cause value, wherein the cause value comprises information indicating that the UE hands over unsuccessfully and the cause value is used for indicating that the destination NodeB determines a security algorithm of a source NodeB corresponding to the UE as the applied security algorithm, and establishes the radio link applying the security algorithm of the source NodeB.

* * * * *